United States Patent [19]

Arima et al.

[11] Patent Number: 5,089,575

[45] Date of Patent: Feb. 18, 1992

[54] METHOD FOR THE PREPARATION OF A COPOLYMER OF VINYL CHLORIDE AND AN N-SUBSTITUTED MALEIMIDE COMPOUND

[75] Inventors: Sadaichi Arima; Kouzou Kuwabara; Shigehiro Hoshida, all of Ibaraki, Japan

[73] Assignee: Shin-Etsu Chemical Co., Ltd., Tokyo, Japan

[21] Appl. No.: 411,845

[22] Filed: Sep. 25, 1989

[30] Foreign Application Priority Data

Sep. 28, 1988 [JP] Japan .................. 63-243266

[51] Int. Cl.$^5$ .................. C08F 2/18
[52] U.S. Cl. .................. 526/200
[58] Field of Search .................. 526/200

[56] References Cited

U.S. PATENT DOCUMENTS 3,756,991 9/1973 Kuhne et al. .................. 526/248
4,143,224 3/1979 Klippert et al. .

FOREIGN PATENT DOCUMENTS 0015586 9/1918 Netherlands .................. 526/200

*Primary Examiner*—Joseph L. Schofer
*Assistant Examiner*—Alex H. Walker
*Attorney, Agent, or Firm*—McAulay Fisher Nissen Goldberg & Kiel

[57] ABSTRACT

A highly heat-resistant and thermally stable polyvinyl chloride resin can be prepared by copolymerizing vinyl chloride monomer and an N-substituted maleimide compound without decreasing the ingerently excellent properties of polyvinyl chloride resins when the monomer mixture is suspension-copolymerized in an aqueous medium containing a suspending agent which is a combination of three different polymers including: (a) a first partially saponified polyvinyl alcohol having an average degree of polymerization in the range from 700 to 3000 and a degree of saponification in the range from 70 to 95%; (b) a second partially saponified polyvinyl alcohol having an average degree of polymerization in the range from 300 to 600 and a degree of saponification in the range from 35 to 55%; and (c) a water-soluble cellulose derivative of which a 0.2% by weight aqueous solution has a surface tension not exceeding 55 dyn/cm at 25° C., in a specified proportion.

3 Claims, No Drawings

METHOD FOR THE PREPARATION OF A COPOLYMER OF VINYL CHLORIDE AND AN N-SUBSTITUTED MALEIMIDE COMPOUND

BACKGROUND OF THE INVENTION

The present invention relates to a method for the preparation of a copolymer of vinyl chloride and an N-substituted maleimide compound. More particularly, the invention relates to a method for the preparation of a copolymer of vinyl chloride and an N-substituted maleimide compound having, as compared with conventional polyvinyl chloride resins, greatly improved heat resistance and thermal stability and usefulness as a material of various kinds of polyvinyl chloride-based molded articles such as tubes, corrugated boards, flooring boards, window sashes and the like.

As is well known, polyvinyl chloride-based resins are widely used in the form of molded articles not only in the household applications but also in a variety of industrial applications by virtue of their high resistance against aging to ensure long durability and excellent mechanical properties along with the low costs in the mass production of the resins.

One of the disadvantageous properties of these polyvinyl chloride-based resins, which are mostly prepared by the method of suspension polymeriation, is their relatively low heat resistance and thermal stability readily to cause thermal deformation at an elevated temperature so that the molded articles prepared from the resin can hardly be used in an application in which the article may have a chance to be heated at an elevated temperature. Accordingly, many attempts and proposals have been made to obtain a polyvinyl chloride-based resin having improved heat resistance and thermal stability. One of the ways hitherto undertaken with this purpose is to copolymerize vinyl chloride with one or more of other comonomers along a guide line that certain copolymers of vinyl chloride may have higher heat resistance or thermal stability than a homopolymeric polyvinyl chloride resin. N-Substituted maleimide compounds are among the comonomers used for such a purpose (see, for example, Japanese Patent Publications No. 41-9551 and No. 44-12433). Copolymers of vinyl chloride and an N-substituted maleimide compound, however, have a defect that the particle size distribution of the resin particles prepared by the suspension polymerization is usually less uniform than the homopolymeric resins and the porosity of the resin particles is small so that problems are caused in the molding process of the resin that proceeding of the so-called gelation with a plasticizer is slow and the molded articles may be sometimes non-uniform with appearance of colored spots on the surface.

SUMMARY OF THE INVENTION

The present invention accordingly has an object to provide a novel method for the preparation of a copolymeric resin of vinyl chloride and an N-substituted maleimide compound by the suspension polymerization, which is capable of giving a copolymeric resin of vinyl chloride and an N-substituted maleimide compound having a uniform particle size distribution with an outstandingly large bulk density and well developed porosity to ensure rapid gelation with a plasticizer.

Thus, the method of the present invention for the preparation of a copolymer of vinyl chloride and an N-substituted maleimide compound comprises:

suspension-polymerizing a binary monomeric mixture composed of from 50 to 99% by weight of vinyl chloride monomer and from 50 to 1% by weight of an N-substituted maleimide compound represented by the general formula

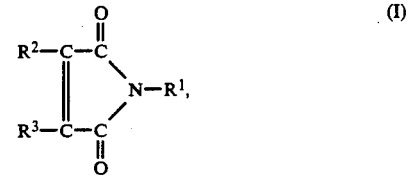

in which $R^1$ is an unsubstituted or substituted aliphatic, alicyclic or aromatic monovalent hydrocarbon group having 1 to 30 carbon atoms and $R^2$ and $R^3$ are each, independently from the other, an atom of hydrogen, fluorine, chlorine or bromine, a cyano group or an alkyl group having 1 to 3 carbon atoms, in an aqueous polymerization medium containing, as a suspending agent in combination:

(a) from 0.01 to 0.1 part by weight of a first partially saponified polyvinyl alcohol having an average degree of polymerization in the range from 700 to 3000 and a degree of saponification in the range from 70 to 95%;

(b) from 0.001 to 0.2 part by weight of a second partially saponified polyvinyl alcohol having an average degree of polymerization in the range from 300 to 600 and a degree of saponification in the range from 35 to 55%; and (c) from 0.001 to 0.2 part by weight of a water-soluble cellulose derivative of which a 0.2% by weight aqueous solution has a surface tension not exceeding 55 dyn/cm at 25° C., each amount in parts by weight being per 100 parts by weight of the monomeric mixture.

DETAILED DESCRIPTION OF THE PREFERRED EMBODIMENTS

The monomeric mixture to be suspension-polymerized according to the inventive method is a binary mixture composed of from 50 to 99% by weight of vinyl chloride monomer and from 50 to 1% by weight of an N-substituted maleimide compound represented by the general formula (I) given above. The group denoted by the symbol $R^1$ is an unsubstituted or substituted aliphatic, alicyclic or aromatic monovalent hydrocarbon group having 1 to 30 carbon atoms including the carbon atoms in the substituting group when the substituent group to $R^1$, if any, has one or more carbon atoms. The groups denoted by the symbols $R^2$ and $R^3$ are each, independently from the other, an atom of hydrogen or a halogen, e.g., fluorine, chlorine and bromine, cyano group or alkyl group having 1 to 3 carbon atoms.

Particular examples of the N-substituted maleimide compound, to which the inventive method is applicable, include: N-methyl maleimide; N-ethyl maleimide; N-n-propyl maleimide; N-isopropyl maleimide; N-butyl maleimide; N-tert-butyl maleimide; N-hexyl maleimide; N-cyclohexyl maleimide; N-phenyl maleimide; N-(2-, 3-or 4-)hydroxyphenyl maleimide; N-(2-, 3-or 4-)methoxyphenyl maleimide; N-(2-, 3-or 4-) chlorophenyl maleimide; N-(2-, 3-or 4-)carboxyphenyl maleimide; N-(2-, 3-or 4-)nitrophenyl maleimide; N-lauryl maleimide; N-9,10-ethano-9,10-dihydroanthracene maleimide, N-cyclohexyl 3-chloromaleimide; N-cyclohexyl 3-methylmaleimide; N-hexyl 4-chloromaleimide and the like, of which particularly preferred ones are those having a methyl group, tert-butyl group, cyclohexyl group or ethano-9,10-dihydroanthracene residue as the N-substituting group denoted by $R^1$.

The monomer mixture to be suspension-polymerized according to the inventive method in the presence of a free-radical polymerization initiator is a binary mixture composed of from 50 to 99% by weight of vinyl chloride monomer and from 1 to 50% by weight of the N-substituted maleimide compound or, preferably, from 70 to 95% by weight of the former monomer and from 30 to 5% by weight of the latter monomer. When the amount of the N-substituted maleimide compound is too small, the desired improvement in the heat resistance of the resin product cannot be fully achieved as a matter of course. When the amount thereof is too large, on the other hand, the melting temperature of the resultant copolymeric resin would be too high to be molded without troubles according to a conventional molding process.

The most characteristic feature of the inventive method is that the above described monomeric mixture is suspension-polymerized in an aqueous suspension medium containing three kinds of polymers in combination as a suspending agent. The three kinds of polymers as the suspending agent include:

(a) a first partially saponified polyvinyl alcohol having an average degree of polymerization in the range from 700 to 3000 or, preferably, from 900 to 2500 and a degree of saponification in the range from 70 to 95%;

(b) a second partially saponified polyvinyl alcohol having an average degree of polymerization in the range from 300 to 600 and a degree of saponification in the range from 35 to 55%; and (c) a water-soluble cellulose derivative of which a 0.2% by weight aqueous solution has a surface tension not exceeding 55 dyn/cm at 25° C.

When the polymer (a), i.e. the first partially saponified polyvinyl alcohol has an average degree of polymerization exceeding the above mentioned upper limit or the degree of saponification thereof is too high, the copolymeric resin particles obtained by the suspension polymerization would have a decreased porosity to cause appearance of colored spots on the molded articles of the resin while, when the average degree of polymerization or the degree of saponification is too low, the stability of the suspension of the monomer mixture in the aqueous medium would be disadvantageously decreased resulting in a broadened particle size distribution of the resin powder. The amount of this polymer (a) added to the aqueous suspension medium is usually in the range from 0.01 to 0.1 part by weight or, preferably, from 0.03 to 0.08 part by weight per 100 parts by weight of the monomeric mixture to be suspension-polymerized in the aqueous medium. When the amount thereof is too large, the particle size distribution of the resultant copolymeric resin powder would be too fine to have a decreased bulk density while, when the amount thereof is too small, the stability of the aqueous suspension of the monomer mixture is decreased resulting in a broadened particle size distribution of the resin powder to affect the workability in the molding works.

When the polymer (b), i.e. the second partially saponified polyvinyl alcohol, has an average degree of polymerization exceeding the above mentioned upper limit or the degree of saponification thereof is too high, the copolymeric resin particles obtained by the suspension polymerization would have a decreased porosity to decrease the workability of the resin in molding while, when the average degree of polymerization or the degree of saponification is too low, the stability of the suspension of the monomer mixture in the aqueous medium would be disadvantageously decreased resulting in a broadened particle size distribution of the resin powder. The amount of this polymer (b) added to the aqueous suspension medium is usually in the range from 0.001 to 0.2 part by weight or, preferably, from 0.005 to 0.008 part by weight per 100 parts by weight of the monomeric mixture to be suspension-polymerized in the aqueous medium.

Examples of the water-soluble cellulose derivative as the polymer (c) include: methyl cellulose; ethyl cellulose; hydroxyethyl cellulose; hydroxypropyl cellulose; hydroxypropyl methyl cellulose; carboxymethyl cellulose and the like though not particularly limited thereto. It is essential that these water-soluble cellulose derivatives should give an aqueous solution of 0.2% by weight concentration having a surface tension not exceeding 55 dyn/cm at 25° C. When the cellulose derivative gives an aqueous solution of which the surface tension is too high, the resultant resin particles would have a somewhat decreased porosity with poor workability in molding of the resin. The amount of this polymer (c) added to the aqueous suspension medium is usually in the range from 0.001 to 0.2 part by weight or, preferably, from 0.005 to 0.008 part by weight per 100 parts by weight of the monomeric mixture to be suspension-polymerized in the aqueous medium.

Besides the above mentioned limitation in the amount of each of the polymers (a), (b) and (c) added to the suspension medium given in relation to the amount of the monomer mixture, it is also preferable that the proportion of the amounts of these polymers (a):(b):(c) is 10:(0.1 to 20):(0.1 to 20) by weight or, more preferably, 10:(1 to 16):(1 to 16) by weight. When the amount of the polymer (b) is too small relative to the polymer (a), the copolymeric resin particles cannot be imparted with well developed porosity to badly affect the workability of the resin in molding while, when the amount of the polymer (b) is too large relative to the polymer (a), stability of the suspension of the monomeric mixture in the aqueous medium is decreased so that the resin product obtained thereby would have a broadened particle size distribution to cause troubles in handling of the powdery resin. When the amount of the polymer (c) relative to the polymer (a) is too small, the copolymeric resin particles cannot be imparted with well developed porosity to badly affect the workability of the resin in molding while, when the amount of the polymer (c) is too large relative to the polymer (a), the particle size distribution of the copolymeric resin powder would be too fine to decrease the workability in handling.

Like conventional process for the suspension polymerization of vinyl chloride, the copolymerization reaction of the vinyl chloride monomer and N-substituted maleimide compound according to the inventive method is carried out in the presence of a free-radical polymerization initiator which can be any of conventionally used ones. Examples of the suitable free-radical polymerization initiator include: decanoyl peroxide; lauroyl peroxide; benzoyl peroxide; diisopropylperoxy dicarbonate; di(2-ethylhexylperoxy) dicarbonate; di(ethoxyethylperoxy) dicarbonate; tert-butylperoxy pivalate; tert-hexylperoxy pivalate; tert-butylperoxy neodecanoate; α-cumylperoxy neodecanoate; acetyl cyclohexyl sulfonyl peroxide; 2,4,4-trimethylpentyl-2-peroxy phenoxy acetate; 3,5,5-trimethylhexanoyl peroxide; and other organic peroxides as well as azo compounds such as α,α'-azobisisobutyronitrile; α,α'-azobis-2,4-dimethyl valeronitrile; α,α'-azobis(4-methoxy-2,4-dimethyl valeronitrile) and the like. These organic polymerization initiators can be used either singly or as a combination of two kinds or more according to need. It is further optional that an inorganic peroxide such as ammonium persulfate, potassium persulfate, hydrogen peroxide and the like is used in combination therewith. The amount of the polymerization initiator added to the polymerization mixture is usually in the range from 0.05 to 0.5% by weight based on the total amount of the monomer mixture.

The suspension polymerization of the monomer mixture in the aqueous medium is carried out at a temperature in the range from 0° to 100° C. or, preferably, from 30° to 80° C. under pressurization. The polymerization reaction is complete usually within 1 to 50 hours or, in most cases, within 3 to 40 hours. All of the comonomers can be introduced into the polymerization reactor prior to the start of temperature elevation together with other constituents of the polymerization mixture. Alternatively, it is optional that all of the constituents of the polymerization mixture excepting the N-substituted maleimide compound are first introduced into the reactor and the N-substituted maleimide compound is continuously introduced into the polymerization mixture after the mixture has been controlled at a specified polymerization temperature mentioned above although this method is less preferable in respect of the higher uniformity and the heat resistance of the copolymeric resin product.

It is of course optional that the polymerization mixture further contains a third comonomer copolymerizable with vinyl chloride and the N-substituted maleimide compound or a polymeric compound graft-copolymerizable therewith in an amount not exceeding 30% by weight or, preferably, not exceeding 15% by weight based on the total amount of the overall monomeric mixture. When the amount thereof is too large, the excellent properties inherent in polyvinyl chloride resins, such as the excellent mechanical properties and durability, and the desired improvement by the copolymerization of vinyl chloride with the N-substituted maleimide compound would be reduced.

Examples of the third comonomer to be copolymerized with vinyl chloride and the N-substituted maleimide compound include: vinyl esters such as vinyl acetate, vinyl propionate, vinyl caproate, vinyl laurate, vinyl stearate and the like; olefins such as ethylene, propylene, isobutylene and the like; alkyl vinyl ethers such as vinyl isobutyl ether, vinyl octyl ether, vinyl dodecyl ether, vinyl aryl ethers and the like; halogenated olefins other than vinyl chloride such as vinylidene chloride, vinyl fluoride, vinyl bromide, allyl chloride and the like; acrylic and methacrylic esters such as ethyl acrylate, n-butyl acrylate, n-butyl methacrylate, 2-ethylhexyl acrylate, 2-ethylhexyl methacrylate, stearyl methacrylate and the like; ethylenically unsaturated carboxylic acids and anhydrides thereof such as acrylic acid, methacrylic acid, crotonic acid, maleic anhydride, itaconic anhydride and the like; ethylenically unsaturated nitrile compounds such as acrylonitrile, methacrylonitrile and the like, and so on.

Further, the polymeric additive to be graft-copolymerized includes copolymers of ethylene and vinyl acetate, copolymers of ethylene and ethyl acrylate, chlorinated polyethylenes, polyurethanes, copolymers of butadiene, styrene and methyl methacrylate, copolymers of butadiene, acrylonitrile and styrene or α-methylstyrene, poly(butyl acrylates), butyl rubbers, polystyrenes, copolymers of styrene and butadiene, crosslinked acrylic rubbers and the like.

In addition to the above described monomeric and polymeric additives, it is optional that the polymerization mixture further contains various kinds of known additives conventionally used in the suspension polymerization of vinyl chloride and other monomers including controlling agents for the degree of polymerization, chain transfer agents, pH controlling agents, gelation improvers, antistatic agents, antioxidants, scale-deposition inhibitors and the like according to need.

The various conditions in practicing the method of the present invention can be about the same as in the conventional suspension polymerization of vinyl chloride in connection with the manner by which the polymerization reactor is charged with the aqueous medium, monomeric constituents, suspending agents, polymerization initiators and the like. The relative amounts of these constituents of the polymerization mixture can also be conventional.

The copolymeric resin product obtained by the inventive method retains the excellent workability in molding equivalent to that of homopolymeric general-purpose polyvinyl chloride resins and gives a molded article having excellent heat resistance and mechanical properties. Accordingly, it is of course optional that the resin product obtained by the inventive method is blended according to need with one or more of other polymers to give a molding compound as in the molding of conventional polyvinyl chloride resins. Examples of such an additive polymer include homopolymeric polyvinyl chloride resins, copolymers of vinyl chloride with an olefin such as ethylene, propylene and the like, multiple copolymers obtained by the graft polymerization of vinyl chloride on to a copolymer of ethylene and vinyl acetate, copolymers of ethylene and ethyl acrylate, chlorinated polyethylene and the like, and so on. In addition, it is also optional according to need that the molding compound based on the resin product obtained by the inventive method is admixed with various kinds of known additives conventionally used in molding of polyvinyl chloride resins including stabilizers, processing aids, lubricants, fillers, flame retardants, ultraviolet absorbers, antioxidants, antistatic agents, pigments and the like.

In the following, examples and comparative examples are given to illustrate the inventive method in more detail but not to limit the scope of the invention in any way.

EXAMPLE 1

Into a polymerization reactor of 100 liter capacity were introduced 56 kg of pure water, 60 g of di-2-ethylhexylperoxy carbonate, 10.8 g of a first partially saponified polyvinyl alcohol having an average degree of polymerization of about 1500 and a degree of saponification of 80%, 1.2 g of a second partially saponified polyvinyl alcohol having an average degree of polymerization of about 600 and a degree of saponification of 40%, 12.0 g of a hydroxypropyl cellulose of which a 0.2% by weight aqueous solution had a surface tension of 46 dyn/cm at 25° C. and 2.5 kg of N-cyclohexyl maleimide to form an aqueous polymerization medium containing the maleimide compound dissolved therein. After evacuation of the air inside the reactor, 21.5 kg of vinyl chloride monomer were introduced thereinto and the temperature of the polymerization mixture was increased to 57° C. to start the polymerization reaction. When the pressure inside the reactor had dropped to 6.0 kg/cm$^2$ G after about 8 hours, the unreacted vinyl chloride monomer was discharged out of the reactor until the pressure inside the reactor reached normal pressure at 57° C. and the polymerizate slurry was taken out of the reactor, dehydrated and dried in a conventional manner.

The thus obtained copolymeric resin powder, referred to as the resin I hereinbelow, was subjected to the tests of the plasticizer absorption, extrusion-moldability, particle size distribution and appearance of colored spots on a molded article by the testing methods described below to give the results shown in the table.

Test of plasticizer absorption (item 1 in the table): a 10 g portion of the resin powder was blended with 20 g of dioctyl phthalate and, after standing for 1 hour at room temperature, the blend was centrifuged to remove the unabsorbed dioctyl phthalate and to determine the amount of the dioctyl phthalate absorbed by the resin powder. The values are given in phr (parts per 100 parts resin) in the table.

Test of extrusion-moldability (item 2 in the table): a molding compound prepared from 100 parts by weight of the resin powder, 5 parts by weight of a lead-based stabilizer and 0.003 part by weight of carbon black was extrusion-molded using an extrusion molding machine of 50 mm diameter into a rod having a ⅛-inch diameter and the appearance of the thus molded resin rod was visually examined to evaluate the surface condition according to the following criteria.

A: smooth and uniform surface without flow marks and unevenness of surface gloss
B: smooth surface with slight flow marks
C: smooth surface with noticeable flow marks and unevenness of surface gloss
D: rough surface with large flow marks and great unevenness of surface gloss Test of particle size distribution (item 3 in the table): the resin powder was classified by using a set of sieves of 60, 100 and 200 mesh openings specified in JIS Z 8801 and records were made of the percent amounts retained on the respective screens. The values are given in % by weight in the table as items 3(60), 3(100) and 3(200) for the results using the screens of 60, 100 and 200 mesh, respectively.

Appearance of colored spots (item 4 in the table): a 50 g portion of the resin powder was blended with 25 g of dioctyl phthalate, 0.3 g of tribasic lead sulfate, 1.0 g of lead stearate, 0.01 g of titanium dioxide and 0.005 g of carbon black and, after standing for 30 minutes at room temperature, the blend was milled on a roller mill at 140° C. for 7 minutes and sheeted into a sheet of 0.2 mm thickness, of which the number of colored spots was counted on an area of 100 cm$^2$.

EXAMPLE 2

The experimental procedure was substantially the same as in Example 1 except that the amounts of the first and second partially saponified polyvinyl alcohols were each 12.0 g and the hydroxypropyl cellulose gave a 0.2% by weight aqueous solution having a surface tension of 36 dyn/cm at 25° C. The results obtained by the testing of the resin product, referred to as the resin II hereinbelow, are shown also in the table.

EXAMPLE 3

The experimental procedure was substantially the same as in Example 1 except that the amounts of the first and second partially saponified polyvinyl alcohols were 9.6 g and 14.4 g, respectively, and the hydroxypropyl cellulose gave a 0.2% by weight aqueous solution having a surface tension of 49 dyn/cm at 25° C. The results obtained by the testing of the resin product, referred to as the resin III hereinbelow, are shown also in the table.

EXAMPLE 4

The experimental procedure was substantially the same as in Example 1 except that the suspending agent was a combination of 9.6 g of a first partially saponified polyvinyl alcohol having an average degree of polymerization of about 1500 and a degree of saponification of 75%, 12.0 g of a second partially saponified polyvinyl alcohol having an average degree of polymerization of about 300 and a degree of saponification of 45%, 12.0 g of a hydroxypropyl cellulose of which a 0.2% by weight aqueous solution had a surface tension of 47 dyn/cm at 25° C. The results obtained by the testing of the resin product, referred to as the resin IV hereinbelow, are shown also in the table.

EXAMPLE 5

The experimental procedure was substantially the same as in Example 1 except that the suspending agent was a combination of 12.0 g of a first partially saponified polyvinyl alcohol having an average degree of polymerization of about 1500 and a degree of saponification of 80%, 7.2 g of a second partially saponified polyvinyl alcohol having an average degree of polymerization of about 500 and a degree of saponification of 40%, 7.2 g of a methyl cellulose of which a 0.2% by weight aqueous solution had a surface tension of 52 dyn/cm at 25° C. The results obtained by the testing of the resin product, referred to as the resin V hereinbelow, are shown also in the table.

EXAMPLE 6

The experimental procedure was substantially the same as in Example 1 except that the N-cyclohexyl maleimide was replaced with the same amount of N-tert-butyl maleimide and the suspending agent was a combination of 12.0 g of a first partially saponified polyvinyl alcohol having an average degree of polymerization of about 1500 and a degree of saponification of 80%, 4.8 g of a second partially saponified polyvinyl alcohol having an average degree of polymerization of about 400 and a degree of saponification of 35%, 12.0 g of a hydroxyethyl cellulose of which a 0.2% by weight aqueous solution had a surface tension of 53 dyn/cm at 25° C. The results obtained by the testing of the resin product, referred to as the resin VI hereinbelow, are shown also in the table.

EXAMPLE 7

The experimental procedure was substantially the same as in Example 1 except that the suspending agent was a combination of 7.2 g of a first partially saponified polyvinyl alcohol having an average degree of polymerization of about 2000 and a degree of saponification of 80%, 9.6 g of a second partially saponified polyvinyl alcohol having an average degree of polymerization of about 400 and a degree of saponification of 45%, 10.8 g of a hydroxyethyl cellulose of which a 0.2% by weight aqueous solution had a surface tension of 47 dyn/cm at 25° C. The results obtained by the testing of the resin product, referred to as the resin VII hereinbelow, are shown also in the table.

EXAMPLE 8

The experimental procedure was substantially the same as in Example 1 except that the suspending agent was a combination of 19.2 g of a first partially saponified polyvinyl alcohol having an average degree of polymerization of about 2000 and a degree of saponification of 80%, 2.4 g of a second partially saponified polyvinyl alcohol having an average degree of polymerization of about 400 and a degree of saponification of 45%, 19.2 g of a hydroxyethyl cellulose of which a 0.2% by weight aqueous solution had a surface tension of 47 dyn/cm at 25° C. The results obtained by the testing of the resin product, referred to as the resin VIII hereinbelow, are shown also in the table.

EXAMPLE 9

The experimental procedure was substantially the same as in Example 1 except that the suspending agent was a combination of 12.0 g of a first partially saponified polyvinyl alcohol having an average degree of polymerization of about 2000 and a degree of saponification of 80%, 19.2 g of a second partially saponified polyvinyl alcohol having an average degree of polymerization of about 400 and a degree of saponification of 45%, 1.2 g of a hydroxyethyl cellulose of which a 0.2% by weight aqueous solution had a surface tension of 47 dyn/cm at 25° C. The results obtained by the testing of the resin product, referred to as the resin IX hereinbelow, are shown also in the table.

COMPARATIVE EXAMPLE 1

The experimental procedure was substantially the same as in Example 1 except that the amount of the first partially saponified polyvinyl alcohol was 24.0 g with omission of the second partially saponified polyvinyl alcohol and the hydroxypropyl cellulose. The results obtained by the testing of the resin product, referred to as the resin X hereinbelow, are shown also in the table.

COMPARATIVE EXAMPLE 2

The experimental procedure was substantially the same as in Example 1 except that the amounts of the first partially saponified polyvinyl alcohol and the hydroxypropyl cellulose were 14.4 g and 4.6 g, respectively, with omission of the second partially saponified polyvinyl alcohol. The results obtained by the testing of the resin product, referred to as the resin XI hereinbelow, are shown also in the table.

COMPARATIVE EXAMPLE 3

The experimental procedure was substantially the same as in Example 1 except that the second partially saponified polyvinyl alcohol was replaced with the same amount of another partially saponified polyvinyl alcohol having an average degree of polymerization of about 3000 and degree of saponification of 40%. The results obtained by the testing of the resin product, referred to as the resin XII hereinbelow, are shown also in the table.

COMPARATIVE EXAMPLE 4

The experimental procedure was substantially the same as in Example 1 except that the second partially saponified polyvinyl alcohol was replaced with the same amount of another partially saponified polyvinyl alcohol having an average degree of polymerization of about 600 and degree of saponification of 15%. The results obtained by the testing of the resin product, referred to as the resin XIII hereinbelow, are shown also in the table.

TABLE

| Item | 1, phr | 2 | 3(60), % | 3(100), % | 3(200), % | 4, pieces |
|---|---|---|---|---|---|---|
| Resin I | 25 | B | 0 | 20 | 80 | 2 |
| Resin II | 30 | A | 0 | 18 | 78 | 1 |
| Resin III | 25 | B | 0 | 18 | 77 | 1 |
| Resin IV | 25 | B | 0 | 19 | 78 | 2 |
| Resin V | 25 | B | 0 | 22 | 80 | 2 |
| Resin VI | 25 | B | 0 | 18 | 80 | 2 |
| Resin VII | 25 | B | 0 | 20 | 80 | 2 |
| Resin VIII | 25 | B | 0 | 17 | 77 | 1 |
| Resin IX | 31 | B | 0 | 21 | 85 | 5 |
| Resin X | 17 | D | 0 | 5 | 65 | 42 |
| Resin XI | 18 | C | 0 | 20 | 75 | 18 |
| Resin XII | 20 | C | 0 | 22 | 77 | 11 |
| Resin XIII | 22 | C | 0 | 23 | 77 | 10 |

What is claimed is:

1. A method for the preparation of a copolymer of vinyl chloride and an N-substituted maleimide compound comprises: suspension-polymerizing a binary monomeric mixture composed of from 50 to 99% by weight of vinyl chloride monomer and from 50 to 1% by weight of an N-substituted maleimide compound represented by the general formula

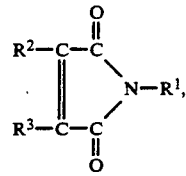

in which $R^1$ is an unsubstituted or substituted aliphatic, alicyclic or aromatic monovalent hydrocarbon group having 1 to 30 carbon atoms and $R^2$ and $R^3$ are each, independently from the other, an atom of hydrogen, fluorine, chlorine or bromine, a cyano group or an alkyl group having 1 to 3 carbon atoms, in an aqueous polymerization medium containing, as a suspending agent in combination:
(a) from 0.01 to 0.1 part by weight of a first partially saponified polyvinyl alcohol having an average degree of polymerization in the range from 700 to 3000 and a degree of saponification in the range from 70 to 95%;
(b) from 0.001 to 0.2 part by weight of a second partially saponified polyvinyl alcohol having an average degree of polymerization in the range from 300 to 600 and a degree of saponification in the range from 35 to 55%; and
(c) from 0.001 to 0.2 part by weight of a water-soluble cellulose derivative of which a 0.2% by weight aqueous solution has a surface tension not exceeding 55 dyn/cm at 25° C., each amount in parts by weight being per 100 parts by weight of the monomeric mixture.

2. The method for the preparation of a copolymer of vinyl chloride and an N-substituted maleimide compound as claimed in claim 1 wherein the water-soluble cellulose derivative is selected from the group consisting of methyl cellulose; ethyl cellulose; hydroxyethyl cellulose; hydroxpropyl cellulose; hydroxpropyl methyl cellulose and carboxymethyl cellulose.

3. The method for the preparation of a copolymer of vinyl chloride and an N-substituted maleimide compound as claimed in claim 1 wherein the weight proportion of the first partially saponified polyvinyl alcohol to the second partially saponified polyvinyl alcohol is in the range from 10: 0.1 to 10: 20 and the weight proportion of the first partially saponified polyvinyl alcohol to the water-soluble cellulose derivative is in the range from 10: 0.1 to 10: 20.

* * * * *